United States Patent [19]

Hodd et al.

[11] Patent Number: 4,481,535
[45] Date of Patent: Nov. 6, 1984

[54] SIGNAL PROCESSING SYSTEM FOR CHOPPER TYPE PYROELECTRIC CAMERA

[75] Inventors: Donald E. Hodd, Niwot; Hans R. Bucher, Boulder, both of Colo.

[73] Assignee: Xedar Corporation, Boulder, Colo.

[21] Appl. No.: 406,150

[22] Filed: Aug. 9, 1982

[51] Int. Cl.³ .............................................. H04N 5/33
[52] U.S. Cl. .................... 358/113; 250/333; 250/334; 358/163
[58] Field of Search ................ 358/113, 163; 250/333, 250/334

[56] References Cited

U.S. PATENT DOCUMENTS

| | | | |
|---|---|---|---|
| 4,004,087 | 1/1977 | Ennulat | 358/113 |
| 4,069,502 | 1/1978 | Nelson | 358/113 |
| 4,177,483 | 12/1979 | Felix | 358/113 |
| 4,225,882 | 9/1980 | Moiroud | 358/113 |
| 4,288,817 | 9/1981 | Igel | 358/163 |

Primary Examiner—Howard W. Britton
Attorney, Agent, or Firm—O'Rourke & Harris

[57] ABSTRACT

A signal processing system is disclosed for a pyroelectric camera having a mechanical chopper in the optical path for causing information sensed by the camera to appear as dynamic information. The pyroelectric camera includes a pyroelectric vidicon tube which senses thermal energy emitted by a target and provides an electrical output signal indicative of the received thermal information. The output signal developed by the pyroelectric vidicon tube includes a relatively large pedestal signal component that is established during flyback due to secondary electron generation and a slightly wider but relatively small pedestal signal that is established due to differences in temperature sensed by the pyroelectric vidicon tube, which pedestal signal is timewise aligned with the relatively large pedestal signal generated due to secondary electron generation. Removal of the pedestal signals avoids saturation of the system amplifiers and limiting of the dynamic range of the camera by thus enabling processing of only the signal components indicative of sensed thermal energy from the target. Background flicker is also eliminated, or reduced, by adding signals of adjacent fields.

4 Claims, 14 Drawing Figures

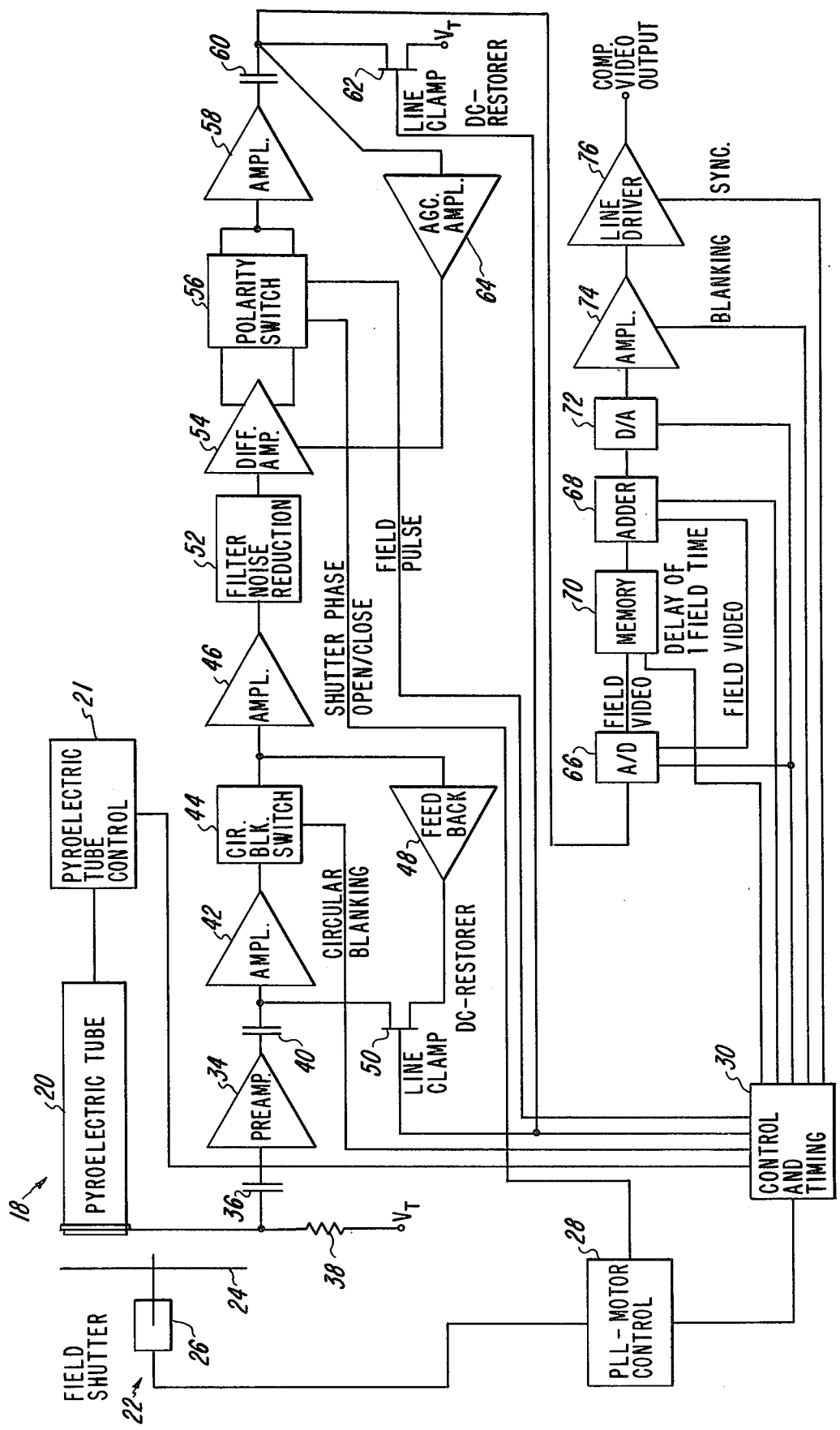

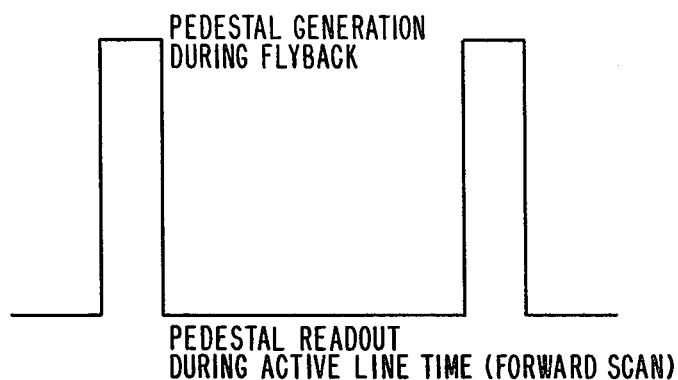
Fig_2
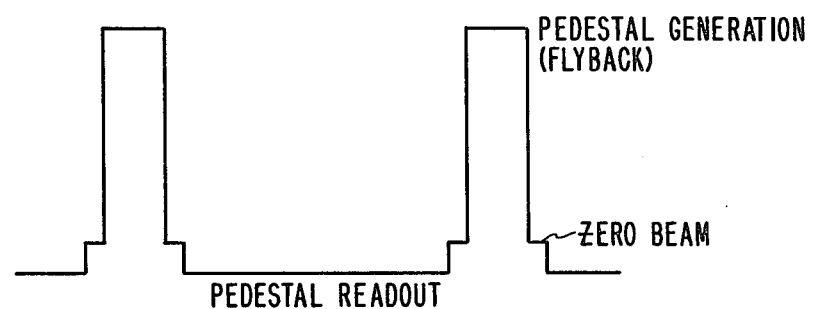
Fig_3
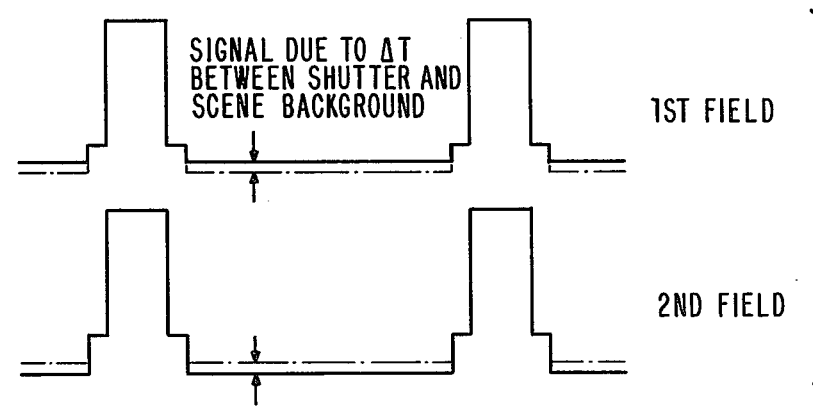
Fig_4
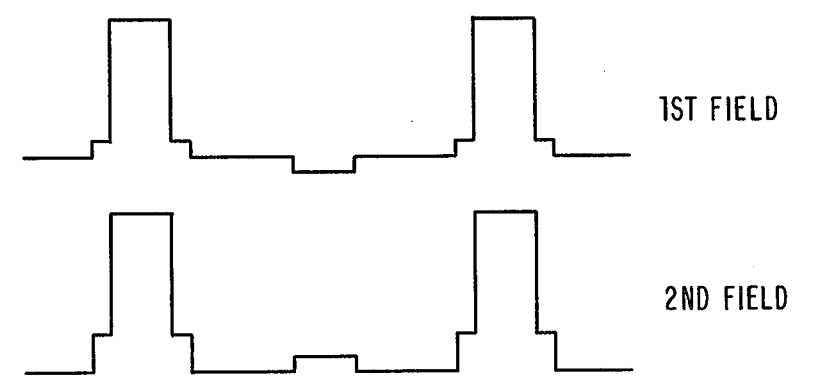
Fig_5

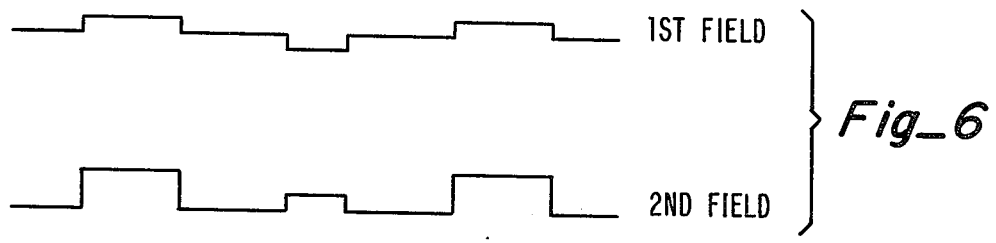
Fig_6
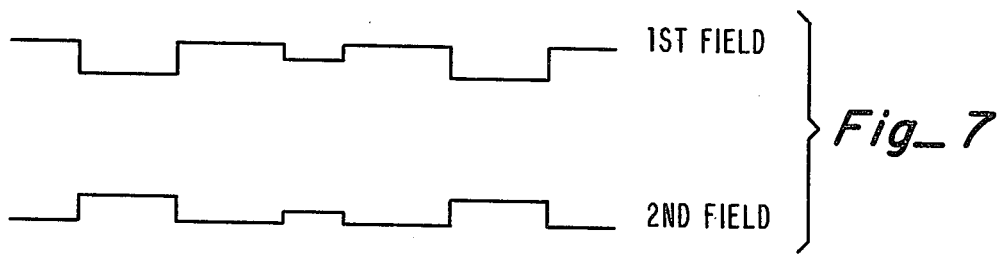
Fig_7
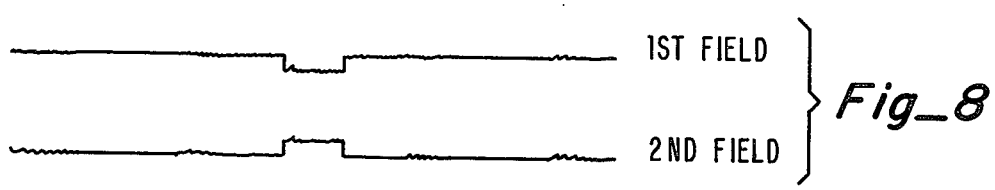
Fig_8
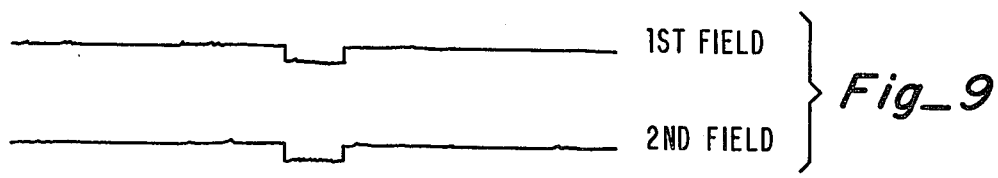
Fig_9
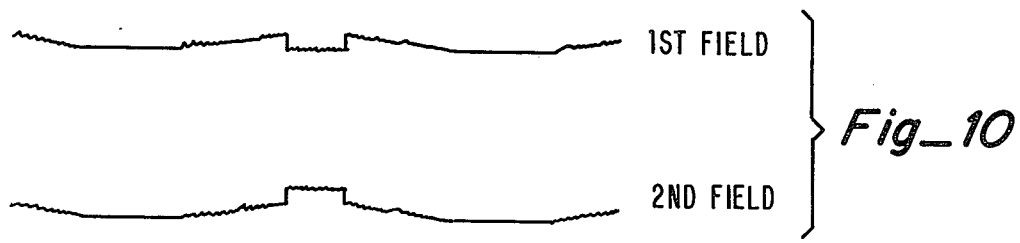
Fig_10

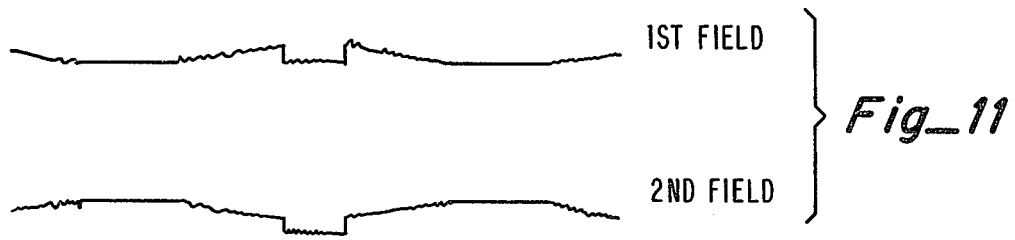
Fig_11
Fig_12
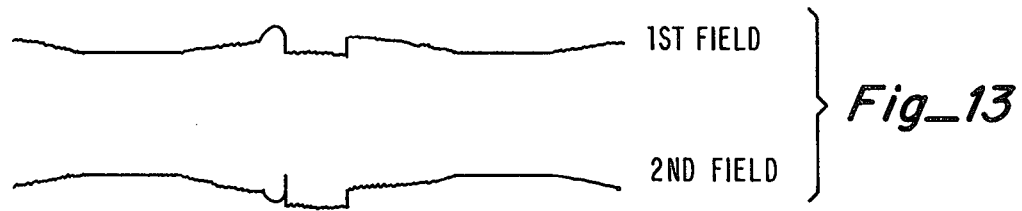
Fig_13
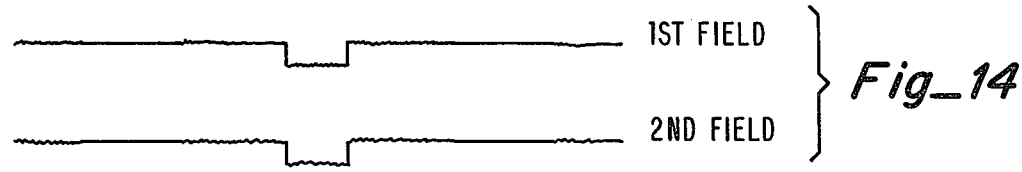
Fig_14

SIGNAL PROCESSING SYSTEM FOR CHOPPER TYPE PYROELECTRIC CAMERA

BACKGROUND OF THE INVENTION

A pyroelectric camera is basically a television camera that is capable of producing an infrared television picture. A conventional vidicon tube may be utilized as the input of a conventional television camera to sense the target "picture" and provides an electrical signal output indicative thereof. Likewise, a pyroelectric vidicon tube may be utilized as the input of the pyroelectric camera to sense a thermal image of the target by receiving thermal energy emitted by the target and provides an electrical signal output indicative thereof. While the electron optic of a pyroelectric vidicon tube may be similar to that of a conventional vidicon tube, and while the pyroelectric vidicon tube can be focussed magnetically and/or electrostatically in the same manner as a conventional vidicon tube, the drive requirements of the pyroelectric vidicon tube differ from those of the conventional vidicon tube due, at least in part, to a necessity in the pyroelectric vidicon tube to generate a pedestal current on the target during line flyback. In addition, the pyroelectric camera is able to sense only changes in thermal energy and thus, unlike the conventional vidicon tube, is unable to image steady-state information.

Attempts have been heretofore made to overcome the inability of the pyroelectric camera to sense only dynamic information, commonly by causing movement of the camera or by placing a mechanical chopper in the optical path of the pyroelectric vidicon tube. Such attempts have, however, not proved to be complete successful and have, for example, caused blurring of the readout display, inadequate picture resolution, and/or flickering of the readout display.

SUMMARY OF THE INVENTION

This invention provides an improved signal processing system for a pyroelectic camera having a pyroelectric vidicon tube and associated chopper assembly. The signal processing system enables effective readout display of a target emitting thermal energy with the display having a high resolution picture that is substantially free of flicker.

It is therefore an object of this invention to provide an improved processing system for a pyroelectric camera.

It is another object of this invention to provide an improved processing system for a pyroelectric camera having a pyroelectric vidicon tube and associated chopper assembly.

It is still another object of this invention to provide an improved processing system for a pyroelectric vidicon camera that enables effective readout display of a thermal energy emitting target.

It is still another object of this invention to provide an improved processing system for a pyroelectric vidicon camera that enables a high resolution readout display that is substantially free of flicker.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a block diagram of the signal processing system of this invention; and FIGS. 2 through 14 are typical waveform presentations illustrating the operation of the processing system shown in FIG. 1.

DESCRIPTION OF THE INVENTION

Signal processing system 18 of this invention, as shown in FIG. 1, is intended for use with pyroelectric cameras now known, and as modified as described hereinafter. Hence, details of such pyroelectric cameras have been included only as deemed necessary to illustrate the invention.

Basically, as brought out hereinabove, the pyroelectric camera includes a pyroelectric vidicon tube 20 which receives thermal energy emitted from a target (not shown) along an optical path extending from the target to the tube. As indicated in FIG. 1, pyroelectric vidicon tube 20 is conventionally controlled by pyroelectric tube control unit 21.

In order for pyroelectric vidicon tube 20 to sense steady-state thermal information, a chopper assembly 22 is provided, which assembly causes tube 20 to receive thermal information and generate an electrical output signal indicative thereof even though the information is not dynamic in nature.

As indicated in FIG. 1, chopper assembly 22 may conventionally include a chopper wheel 24 that is rotated by motor 26 controlled by phase lock loop (PLL) motor control unit 28. PLL motor control unit 28 is controlled by control and timing circuitry 30 conventionally found in the pyroelectric camera (circuitry 30 also controls pyroelectric tube control unit 21) so that the shutter edge is maintained in alignment with the tube reading beam on a field to field basis. In other words, the shutter is caused to rotate to alternately provide first and second fields, with the rotation being at a speed such that during each first field the camera is imaging the target and during each second field the shutter (which is opaque to infrared) blocks passage of the infrared to the pyroelectric vidicon tube.

During the line flyback of the deflection, a pedestal current on the target must be generated by secondary emission in the target in order for the pyroelectric vidicon tube to function properly. This is conventionally accomplished by pulsing the cathode potential sufficiently negative during flyback in response to the target potential while, at the same time, pulsing the gate electrode ($G_1$) of the pyroelectric vidicon tube to control the amount of secondary electron current. In order to stabilize the operation of the pyroelectric vidicon tube, it is also necessary to overscan the tube target, which creates a circular image.

Assuming that the pyroelectric vidicon tube lens is capped, and that the camera optic, lens cap and shutter are at temperature equilibrium (i.e., there is no picture information from a target and no signal to shutter-to-scene temperature difference present in the video signal), then only the pedestal signal generated during flyback is present as the signal output from pyroelectric vidicon tube 20 as shown in FIG. 2.

As shown, the output signal from pyroelectric vidicon tube 20 is not zero during flyback (as would be the case for a conventional vidicon tube), but, instead, includes a positive going pulse during flyback due to secondary electron generation.

During the active line time, the pedestal is read out, resulting in a negative going signal. It is mandetory to re-establish the DC level of the video signal in a vidicon camera chain after amplification in order to preserve the luminance information of the scene imaged. In a standard vidicon TV chain, this is accomplished by a DC restoration circuit which DC-restores the video signal to a DC reference during the flyback interval, at which time the vidicon video signal is zero, providing a convenient reference which is independent of the scene content.

This convenient reference is not ordinarily available in a pyroelectric signal, however, and a second, relatively small amplitude, pedestal signal is generated to overcome this deficiency, by making the flyback pulse of the gate electrode ($G_1$) wider than the cathode pulse (but timewise aligned therewith) resulting in the signal as shown in FIG. 3. As shown, a zero beam point has been provided for clamping.

By removing the lens cap, pyroelectric vidicon tube 20 can now sense the target image, and by rotating the chopper wheel 24, the target image is sensed during each first field and the shutter on the chopper wheel will blank the target during each succeeding second field, so that the pyroelectric vidicon tube alternately images the target and the shutter.

If the shutter temperature and the scene, or target, temperature are at equilibrium and a flat surface is imaged, the video signal output from the pyroelectric vidicon tube would be the same for both fields, as typically shown in FIG. 3.

If the shutter is at a different temperature than the flat surface however (as it is most often true), then the signal will be different from field to field and would appear basically as illustrated in FIG. 4. In the first field, the shutter is open and in the second field the shutter is closed. With the shutter temperature higher than the target (which for reference purposes is assumed to be a flat wall), the pedestal signal during readout is shown in FIG. 4 with the signal generated by the temperature difference between the shutter and flat surface superimposed. Since the pyroelectric tube can only see changes in temperature, this difference in temperature will manifest itself as a positive and negative signal around the pedestal level, with the actual pedestal level becoming lost.

If a small hot target is placed on the target surface, then the pyroelectric vidicon tube output signal will be as shown typically in FIG. 5. As shown, the small hot target will modulate the output signal and during the open field signal it will be going negative. As the shutter is moved into place the hot image is removed (shielded by the IR opaque shutter) causing the opposite polarity signal in the shutter closed signal. Displayed on a monitor, a positive going and negative going field is shown, but the eye would integrate the two fields and result in a zero image with flicker due to the changing background levels from the $\Delta T$ of the shutter and the scene background.

Hence, the information must be processed for display. However, since the modulation signal is much smaller in amplitude than the pedestal signal, the large signal generated during flyback and the pedestal signal during readout (both unwanted signals) must be removed prior to amplification in order to amplify the signal without overloading the amplifiers.

As shown in FIG. 1, the output signal from pyroelectric vidicon tube 20 is coupled to preamplifier 34 through capacitor 36 one side of which has a resistor 38 connected with the $V_T$ power supply. At the output of the preamplifier 34, the signal is the same as typically shown in FIG. 5 but with increased amplitude. The output signal from preamplifier 34 is coupled through capacitor 40 to amplifier 42 the output of which is coupled through circular blanking switch 44 to amplifier 46 and feedback amplifier 48. The output of feedback amplifier 48 is coupled through field effect transistor 50 (receiving a line clamp input from control and timing unit 30) to the input of amplifier 42. This circuitry operates as a DC restorer for clamping the video signal to the DC output level of the feedback amplifier.

Circular blanking switch 44 is controlled by the circular blanking signal from control and timing unit 30, so that the switch is on (the signal passing through) during the target readout and the switch is off during the overscan and the flyback. The signal appearing at the output of the circular blanking switch is shown in FIG. 6.

By adjusting the DC restorer referencing signal (the output DC level of the feedback amplifier), the signal from the pedestal readout can be eliminated resulting in a signal as typically shown in FIG. 7. The remaining signal is the video signal generated by the difference in temperature of the shutter and the flat surface of the hot target.

Feedback amplifier 48 senses the video signal and, on a field to field basis, is generating a DC reference at the output of the feedback amplifier to maintain the same output signal level for both fields, such that the effects of the difference between shutter temperature and background will be cancelled to provide a typical output signal to amplifier 46 as shown in FIG. 8.

After further amplification by amplifier 48, the signal is coupled through noise reduction filter 52 to differential output amplifier 54. Differential amplifier 54 is connected with polarity switch 56 which is controlled by the field rate pulse (from control and timing unit 30) and the shutter position pulse (shutter open or closed) (from PLL-motor control circuitry 28) to select the video signal on a field to field basis such that a unity polarity signal is obtained typically as shown in FIG. 9.

The output signal from switch 56 is amplified by amplifier 58 the output of which is coupled through capacitor 60 to provide an output which can be displayed on a monitor with DC restored through field effect transistor 62 (receiving the line clamp input from control and timing unit 30) and sync and blanking added. In addition, the output from amplifier 58 to capacitor 60 is fed back through automatic gain control amplifier 64 to differential amplifier 54.

The resulting display will, however, show flicker in the background and by moving (panning) the camera streaking due to the tube thermal lag is experienced making the image unusable in many applications. This background flicker is due to the non-perfect signal uniformity of the pedestal signal (imperfect electron optic and/or non-uniformity of secondary electron generation).

FIG. 10 shows an exaggeration of the signals depicted in FIG. 8 for emphasis. FIG. 11 shows the signal depicted in FIG. 8 after polarity correction. As illustrated, the background non-uniformity switches polarity on a field to field basis introducing field flicker.

Panning the camera will displace the hot target, and removal of this energy causes the opposite polarity signal to be generated such that the signal typically appears as shown in FIG. 12 just after motion.

FIG. 13 shows the same signal after polarity correction. The deficiencies in the signal can be eliminated by adding the first field signal to the second field signal resulting in an output as shown in FIG. 14.

In order to add the two fields, one of the fields must be delayed for one field time after which the two fields are added. As shown in FIG. 1, this is accomplished digitally by coupling the output signal from amplifier 58 through capacitor 60 to analog-to-digital converter 66 one output of which is coupled to adder 68 and the other output of which is coupled to digital memory unit 70 for delaying the field video by one field time after which the memory unit output is coupled to adder 68. The output signal from adder 68 is then coupled through digital-to-analog signal converter 72 to again provide an analog signal output. By this means, the first field signal and the second field signal, the third field signal and the fourth field signal, etc. will be added. As indicated in FIG. 1, analog-to-digital converter 66, adder 68, memory 70, and digital-to-analog converter 72 are all controlled by outputs from control and timing unit 30.

The delay can also be accomplished in an analog delay circuit, but in either case in implementation, it is important to use the minimum number of parts. In addition, instead of adding the signals, they can be subtracted from each other by eliminating the polarity switch.

The analog output signal from digital-to-analog signal converter 72 is then further amplified by amplifier 74 (and again may be DC restored) and then conditioned into a composite video signal by adding blanking and sync from control and timing unit 30 at amplifier 74 and line driver 76, respectively.

As can be appreciated from the foregoing, this invention provides a processing system for a pyroelectric camera having a pyroelectric vidicon tube and an associated chopper assembly that enables effective and enhanced use of the pyroelectric camera.

What is claimed is:

1. A signal processing system for a pyroelectric camera having a pyroelectric vidicon tube and a shutter positionable in the optical path of said pyroelectric vidicon tube, said system comprising:

input means for receiving the output signal from said pyroelectric vidicon tube, said output signal including a first field arising from imaging of a target by said pyroelectric vidicon tube and a second field arising from blanking of imaging of a target by said shutter, with said outputs signal indicative of each said field including pedestal components generated during flyback that have an amplitude greater than signal components due to imaging of targets by said pyroelectric vidicon tube;

pedestal removal means including amplifier means connected to said input means to receive said output signals therefrom, circular blanking means connected with said amplifying means, and feedback means connected from the output of said circular blanking means to the input of said amplifying means whereby said pedestal removal means provides an output signal for each field from said pyroelectric vidicon tube that includes signal components due to imaging of a target without pedestal components;

polarity switching means connected with said pedestal removal means for providing a unity output signal with respect to each of said fields;

signal combining means including delay means for delaying a received signal by one field time, and a combiner for receiving the output from said delay means and the received signal without delay; and output means connected with said signal combining means for providing a composite video signal output suitable for display of targets imaged by said pyroelectric vidicon tube.

2. The system of claim 1 wherein said system includes automatic gain control means connected with said polarity switching means.

3. The system of claim 1 wherein said signal combining means includes an analog-to-digital converter for receiving the input signal, wherein said delay means is a digital memory unit receiving the output of said analog-to-digital converter, wherein said combiner is an adder receiving the output from said delay means and the output from said digital memory unit delayed by one field time, and wherein said signal combining means also includes a digital-to-analog converter for receiving the output from said adder.

4. The system of claim 3 wherein said shutter is controlled by shutter control means, wherein said system includes control and timing circuitry, and wherein said shutter control means, said pyroelectric vidicon tube, said circular blanking means, said polarity switch, and said signal combining means are controlled by said control and timing circuitry.

* * * * *